United States Patent
Tsuji et al.

(10) Patent No.: US 12,360,714 B2
(45) Date of Patent: Jul. 15, 2025

(54) IMAGE FORMING APPARATUS, NON-TRANSITORY COMPUTER READABLE MEDIUM STORING PROGRAM, AND IMAGE FORMING METHOD

(71) Applicant: FUJIFILM Business Innovation Corp., Tokyo (JP)

(72) Inventors: Ayumi Tsuji, Kanagawa (JP); Satoshi Maruyama, Kanagawa (JP); Masaki Watanabe, Kanagawa (JP); Yusuke Taguchi, Kanagawa (JP); Ryo Matsumoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 336 days.

(21) Appl. No.: 17/890,280

(22) Filed: Aug. 18, 2022

(65) Prior Publication Data
US 2023/0280955 A1    Sep. 7, 2023

(30) Foreign Application Priority Data
Mar. 3, 2022    (JP) .................................. 2022-032734

(51) Int. Cl.
*G06F 3/12*    (2006.01)
(52) U.S. Cl.
CPC .......... *G06F 3/1256* (2013.01); *G06F 3/1204* (2013.01); *G06F 3/1226* (2013.01); *G06F 3/1258* (2013.01); *G06F 3/1261* (2013.01)
(58) Field of Classification Search
None
See application file for complete search history.

(56) References Cited

U.S. PATENT DOCUMENTS

| | | | |
|---|---|---|---|
| 8,270,007 B2* | 9/2012 | Pandit | G06Q 10/06 358/1.9 |
| 10,521,173 B2 | 12/2019 | Teruya | |
| 2017/0094083 A1* | 3/2017 | Kanai | H04N 1/00456 |
| 2023/0229365 A1* | 7/2023 | Silverstein | G06F 3/1205 358/1.9 |

FOREIGN PATENT DOCUMENTS

| | | |
|---|---|---|
| JP | 2019078846 | 5/2019 |
| JP | 2020201548 | 12/2020 |

* cited by examiner

*Primary Examiner* — Darryl V Dottin
(74) *Attorney, Agent, or Firm* — JCIPRNET

(57) ABSTRACT

An image forming apparatus includes a processor configured to, in a case where a print instruction to form an image by plural image forming apparatuses is received from a terminal apparatus and a pre-confirmation image of a print result is requested and in a case where an image forming apparatus is not possible to execute a printing process according to setting content designated in the print instruction, generate a pre-confirmation image corresponding to an image, which is obtained in a case where the printing process is executed in a state in which the setting content designated in the received print instruction is changed to setting content that is executable in the image forming apparatus to transmit the generated pre-confirmation image to the terminal apparatus that has transmitted the print instruction, and change the setting content of the received print instruction to the setting content that is executable in the image forming apparatus to transmit the changed setting content to another image forming apparatus that executes a next printing process.

18 Claims, 14 Drawing Sheets

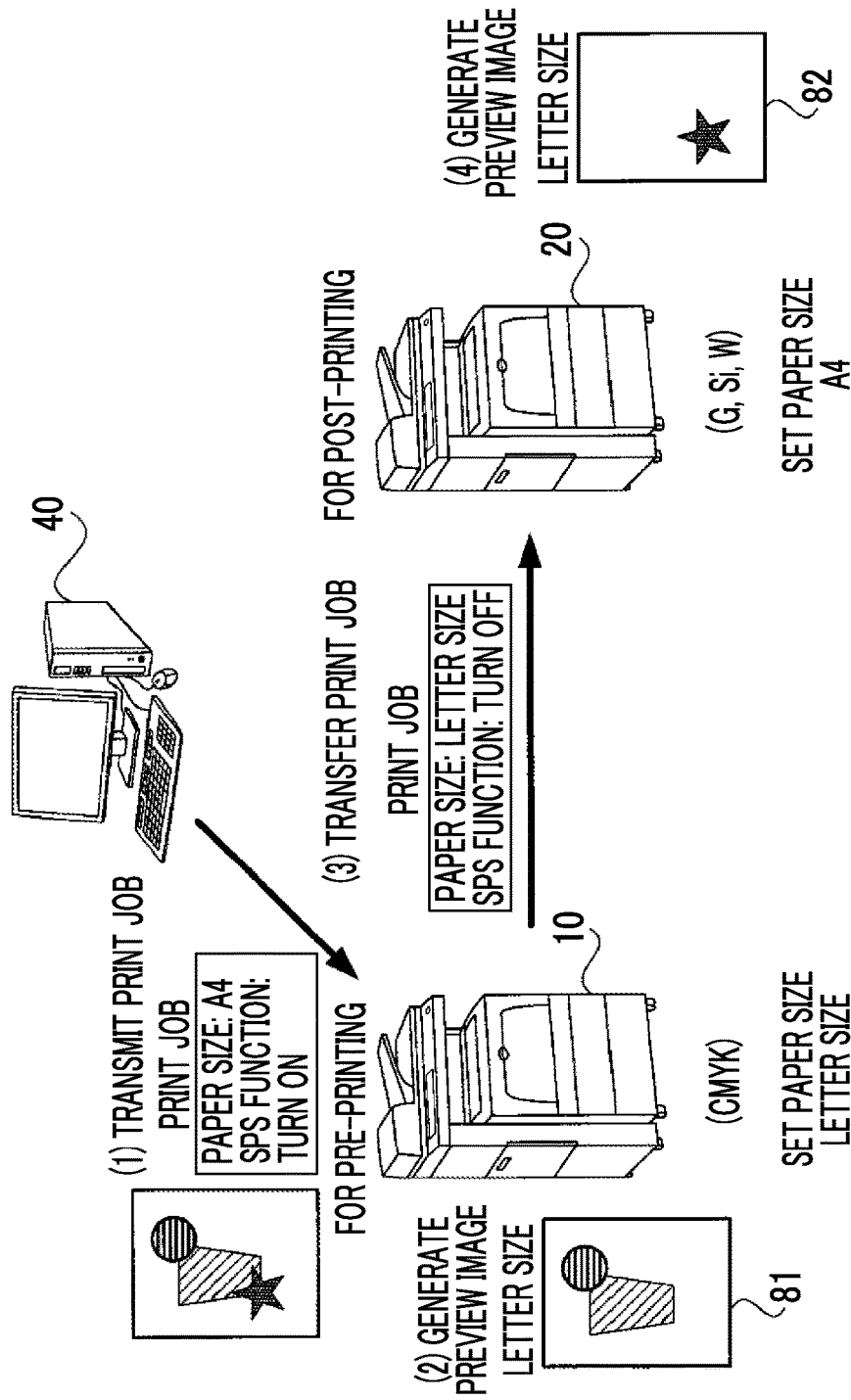

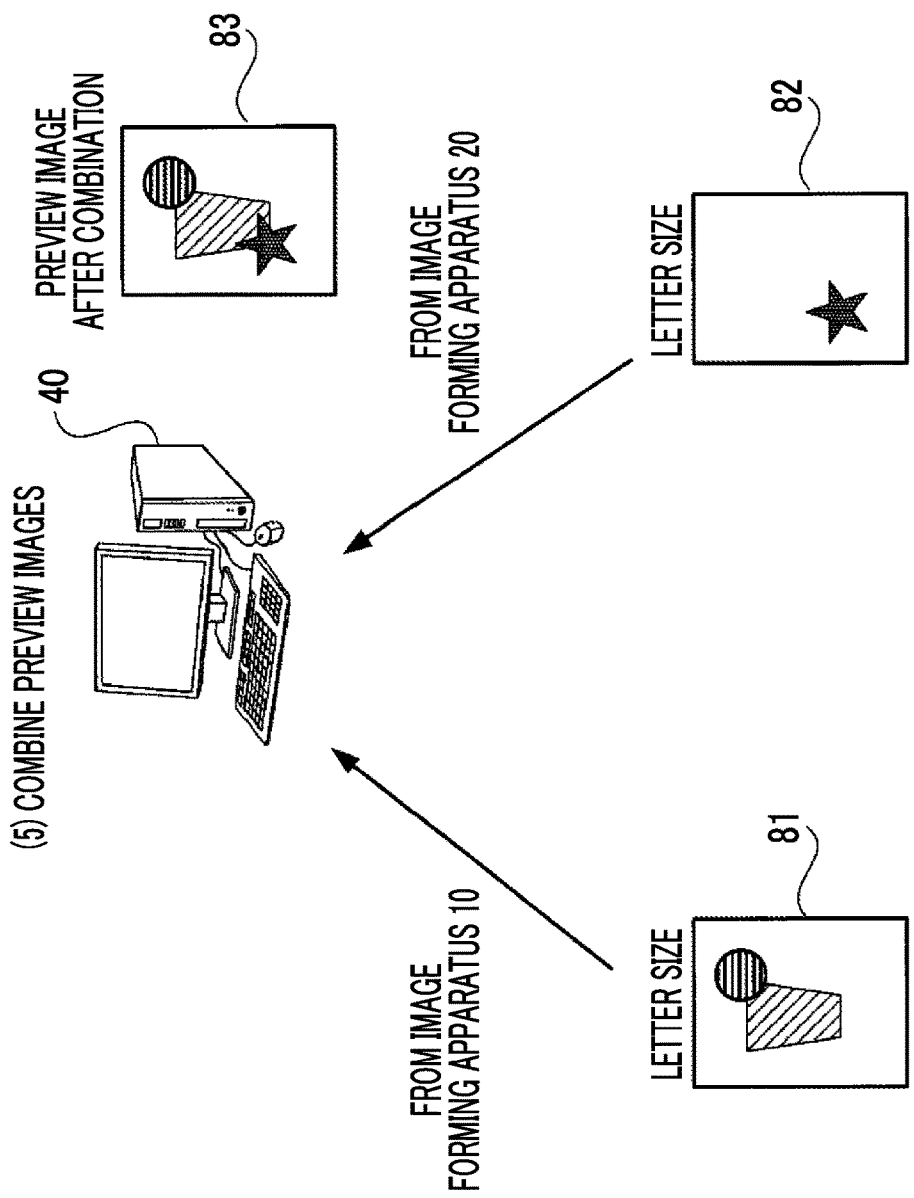

IMAGE FORMING APPARATUS, NON-TRANSITORY COMPUTER READABLE MEDIUM STORING PROGRAM, AND IMAGE FORMING METHOD

CROSS-REFERENCE TO RELATED APPLICATIONS

This application is based on and claims priority under 35 USC 119 from Japanese Patent Application No. 2022-032734 filed Mar. 3, 2022.

BACKGROUND (i) Technical Field

The present invention relates to an image forming apparatus, a non-transitory computer readable medium storing a program, and an image forming method.

(ii) Related Art

JP2019-078846A discloses a printing control device that prevents erroneous printing in a printing apparatus that performs overprinting using a plurality of types of paints.

JP2020-201548A discloses a job management device capable of instructing printing in an appropriate order without complicating a user's work even in a case of a job which requires reprint printing.

SUMMARY

In a case where one print instruction cannot be executed by only one image forming apparatus, there is a case where one print instruction is executed by a plurality of image forming apparatuses. In such a case, in order to obtain a so-called preview image which is the pre-confirmation image of a print result, it is necessary to combine a plurality of pre-confirmation images in a terminal apparatus that transmits the print instruction. Here, the print instruction from the terminal apparatus is transferred and shared in the processing order between the image forming apparatuses in, for example, a series of image forming apparatuses. Each image forming apparatus generates a pre-confirmation image that reflects a process that is executed by the image forming apparatus in charge.

By the way, not all image forming apparatuses can execute the process according to the setting content of the print instruction. In a case where the process cannot be executed according to the setting content of the print instruction, there is a case where the image forming apparatus executes the process after changing the setting content of the print instruction to setting content that can be executed in the image forming apparatus. In this case, the image forming apparatus generates a pre-confirmation image based on the setting content that can be executed in the image forming apparatus. In a case where, between the series of image forming apparatuses, the pre-confirmation image is generated according to the setting of an original print instruction or the pre-confirmation image is generated after changing the setting, there is a case where a contradiction occurs between the pre-confirmation images so that combination is not possible.

Aspects of non-limiting embodiments of the present disclosure relate to an image forming apparatus, a non-transitory computer readable medium storing a program, and an image forming method that can generate a pre-confirmation image of a print result in a case where a printing process is executed by a plurality of image forming apparatuses for one print instruction and even in a case where the printing process cannot be executed while not changing setting content designated in a print instruction in some image forming apparatuses.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to, in a case where a print instruction to form an image by a plurality of image forming apparatuses is received from a terminal apparatus and a pre-confirmation image of a print result is requested and in a case where an image forming apparatus is not possible to execute a printing process according to setting content designated in the print instruction, generate a pre-confirmation image corresponding to an image, which is obtained in a case where the printing process is executed in a state in which the setting content designated in the received print instruction is changed to setting content that is executable in the image forming apparatus to transmit the generated pre-confirmation image to the terminal apparatus that has transmitted the print instruction, and change the setting content of the received print instruction to the setting content that is executable in the image forming apparatus to transmit the changed setting content to another image forming apparatus that executes a next printing process.

BRIEF DESCRIPTION OF THE DRAWINGS

Exemplary embodiment(s) of the present invention will be described in detail based on the following figures, wherein:

FIG. 13 is a diagram for specifically explaining the operation in the image forming system of one exemplary embodiment of the present invention in a case where the paper sizes of paper, which are set in the image forming apparatus 10 and the image forming apparatus 20, are different from each other and the setting content of the print job is changed in the image forming apparatus 10; and FIG. 14 is a diagram for specifically explaining the operation in the image forming system of one exemplary embodiment of the present invention in a case where the paper sizes of paper, which are set in the image forming apparatus 10 and the image forming apparatus 20, are different from each other and the setting content of the print job is changed in the image forming apparatus 10.

DETAILED DESCRIPTION

Hereinafter, an exemplary embodiment of the present invention will be described in detail with reference to the accompanying drawings.

Figure 1:
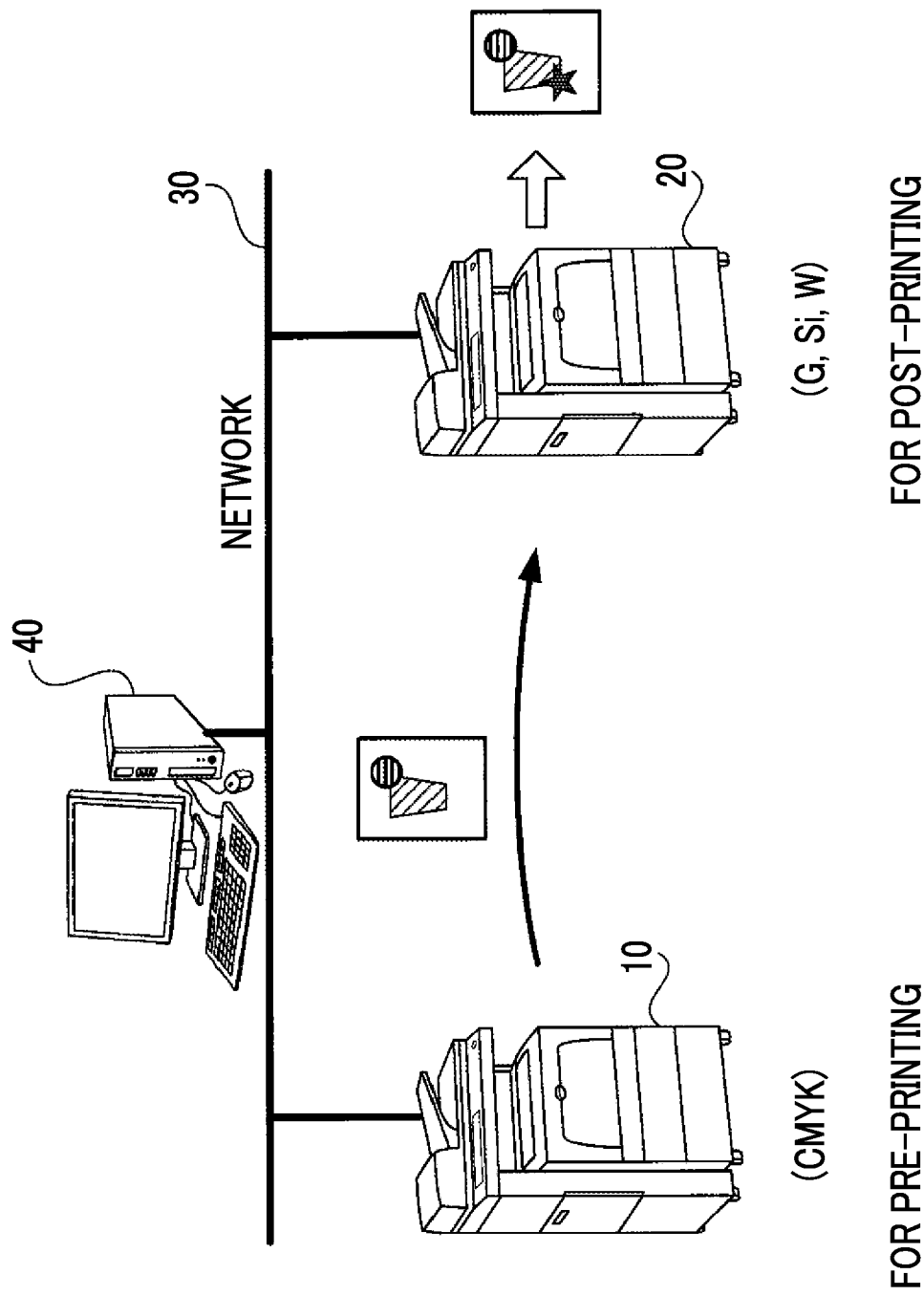
FIG. 1 is a diagram showing a system configuration of an image forming system of one exemplary embodiment of the present invention.

FIG. 1 is a diagram showing a system configuration of an image forming system of one exemplary embodiment of the present invention.

As shown in FIG. 1, the image forming system of one exemplary embodiment of the present invention is configured with image forming apparatuses 10 and 20 and a terminal apparatus 40 which are connected with each other via a network 30. The terminal apparatus 40 generates a print job that is a print instruction, and transmits the generated print job to the image forming apparatus 10 via the network 30.

The image forming apparatuses 10 and 20 are apparatuses so-called multifunctional apparatuses having a plurality of functions such as a printing function, a scanning function, a copying function, and a facsimile function.

Then, the image forming apparatus 10 is configured to be set with toners of CMYK (abbreviation of Cyan, Magenta, Yellow, and Black) colors and to be capable of outputting an image of normal colors by the toners of the CMYK colors on paper. Then, the image forming apparatus 20 is a printer configured to be capable of forming an image of a special color other than the normal colors called the CMYK colors on the paper. Here, the special color includes metallic luster colors such as silver (Si) and gold (G), and various colors other than CMYK, such as white (W) and transparent (clear). For example, in the following present exemplary embodiment, description will be performed using a case where the image forming apparatus 20 is configured to be capable of forming images of three types of special colors of gold (G), silver (Si), and white (W).

Here, in a case where one print job cannot be executed by only one image forming apparatus, there is a case where the one print job is executed by a plurality of image forming apparatuses. For example, there is a case where printing of an image, which contains not only the CMYK colors but also the special color, is executed by performing reprint printing by an image forming apparatus capable of printing an image of the normal colors of CMYK colors and an image forming apparatus capable of printing an image of the special color, such as silver or gold, other than the normal colors. For example, the image forming system of the present exemplary embodiment has a configuration in which, by performing overprint printing using the two image forming apparatuses 10 and 20, not only the image of the normal colors but also the image of the special color can be printed on one sheet of paper.

Here, overprint printing indicates a printing method in which, for a print job from the terminal apparatus 40, an image is first formed by a pre-printing image forming apparatus and an image is formed by being overlaid by a post-printing image forming apparatus on paper, on which the image is formed by the pre-printing image forming apparatus.

In the image forming system of the present exemplary embodiment, the image forming apparatus 10 that performs printing of the normal colors is set as the pre-printing image forming apparatus, and the image forming apparatus 20 that performs printing of the special color is set as the post-printing image forming apparatus.

The image forming apparatus 10 accepts the print job transmitted from the terminal apparatus 40, ignores an instruction of the special color in the accepted print job, and prints the image of only the normal colors on the paper. Then, the image forming apparatus 20 for performing post-printing is registered in advance in the image forming apparatus 10, and the image forming apparatus 10 transfers the print job from the terminal apparatus 40 to the image forming apparatus 20.

Then, in a case where the paper obtained after the image is formed in the image forming apparatus 10 is carried to the image forming apparatus 20 by a user and set in a paper tray, the image forming apparatus 20 prints the image of only the special color in the print job received from the image forming apparatus 10 on the paper set in the paper tray.

As a result, the paper, on which both the image of the normal colors and the image of the special colors are printed, is discharged from the image forming apparatus 20.

Figure 2:
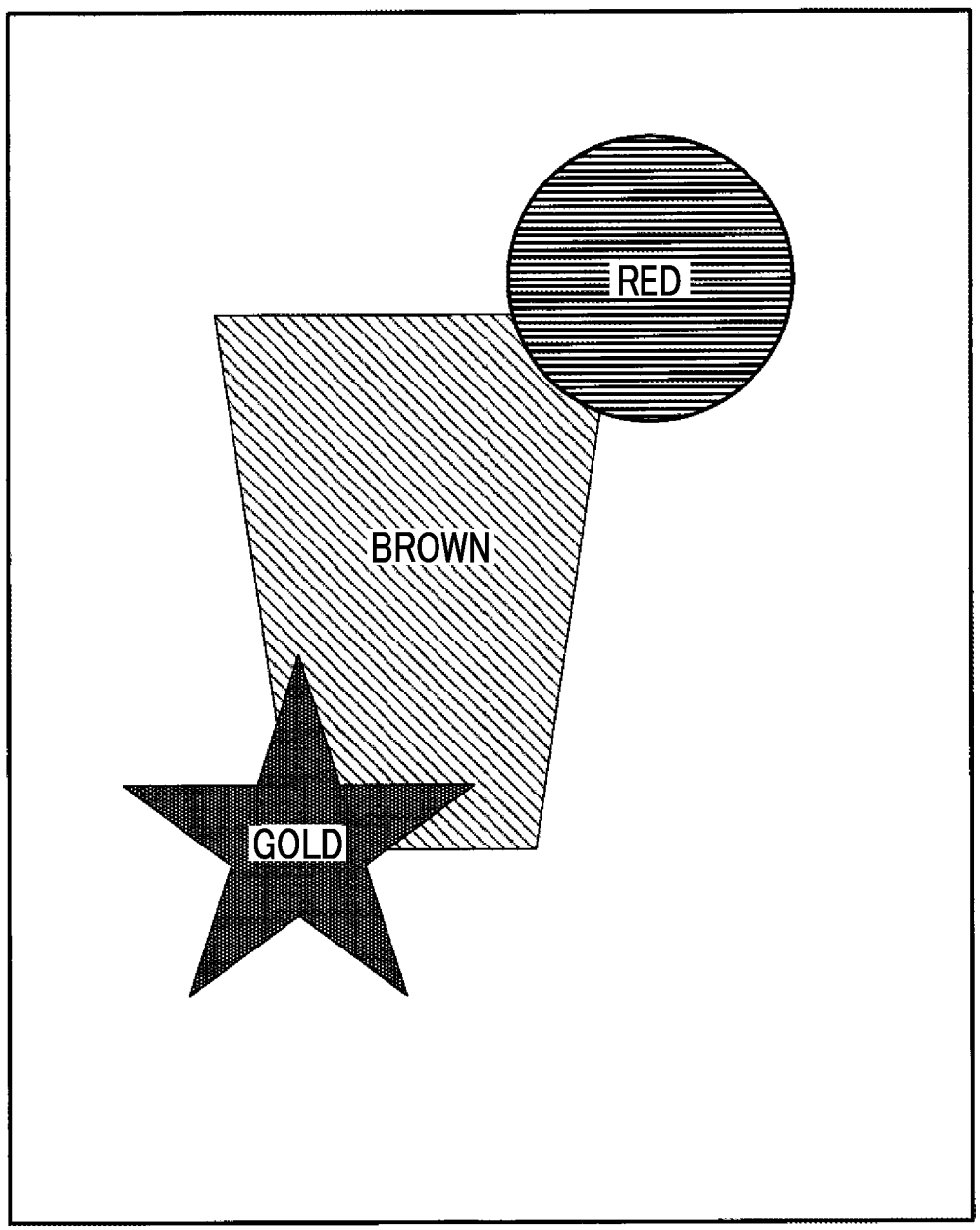
FIG. 2 is a diagram showing an example of an image printed by overprint printing.

FIG. 2 shows an example of an image printed by the overprint printing.

In the example of the image shown in FIG. 2, it can be seen that not only images of a red color and a brown color that can be printed by the combination of CMYK colors but also an image of a gold color are configured in combination. In the example of the image, notation in text, such as the red color, the brown color, or the gold color, indicates that an image with the text is the red color, the brown color, or the gold color, and does not indicate that the text of the red color, the brown color, or the gold color is printed.

Figure 3:
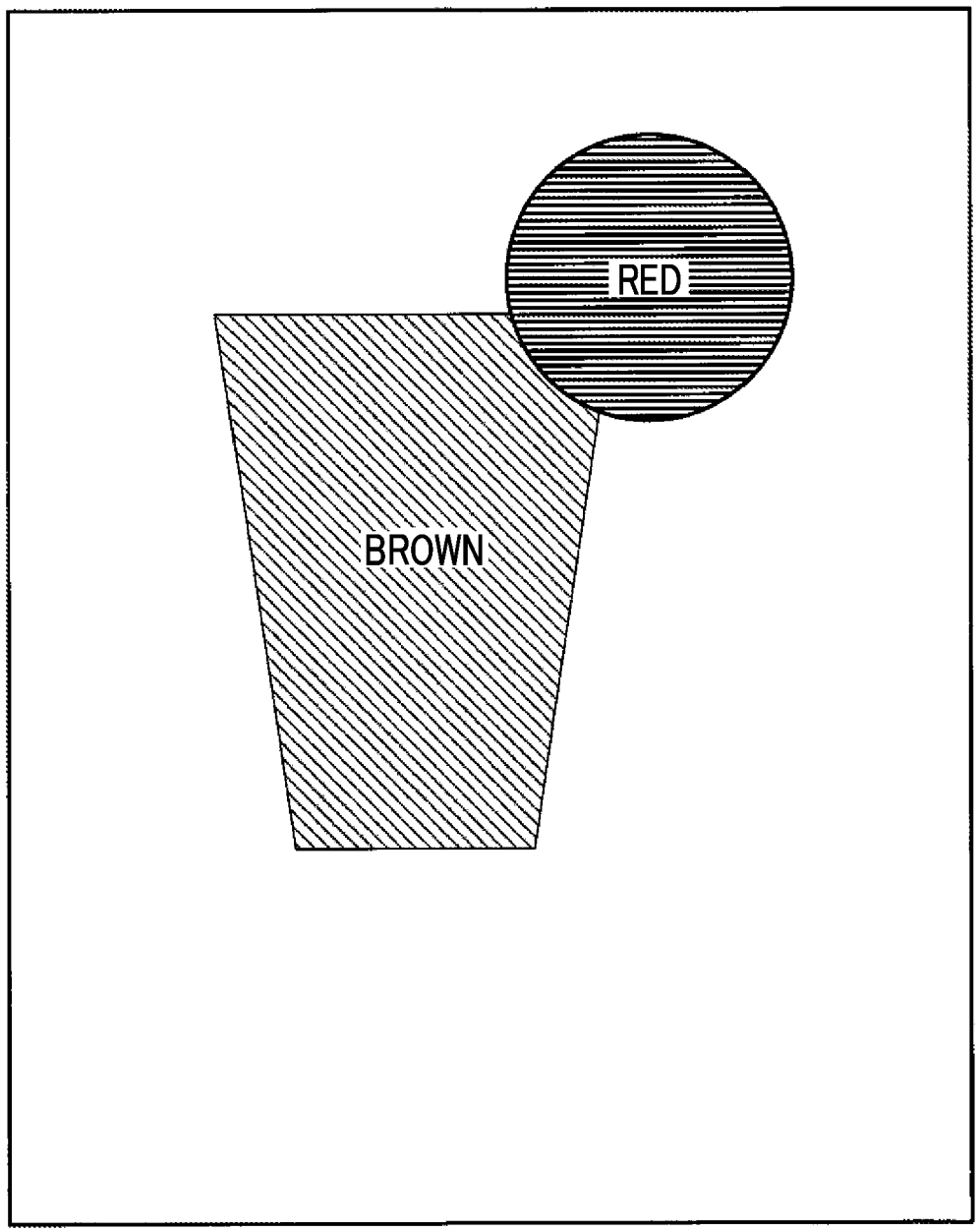
FIG. 3 is a diagram showing an example of an image of a print result in a case where printing is performed by transmitting a print job for printing by overprint printing to an image forming apparatus 10.

FIG. 3 shows an example of an image of a print result in a case where the print job for printing the image is generated in the terminal apparatus 40 and transmitted to the image forming apparatus 10 and printing is performed.

In the example of the image shown in FIG. 3, it can be seen that, in the images included in the print job from the terminal apparatus 40, only an image of a red color and an image of a brown color, which are designated using the CMYK colors, are printed on the paper, and an image of a gold color is not printed.

Figure 4:
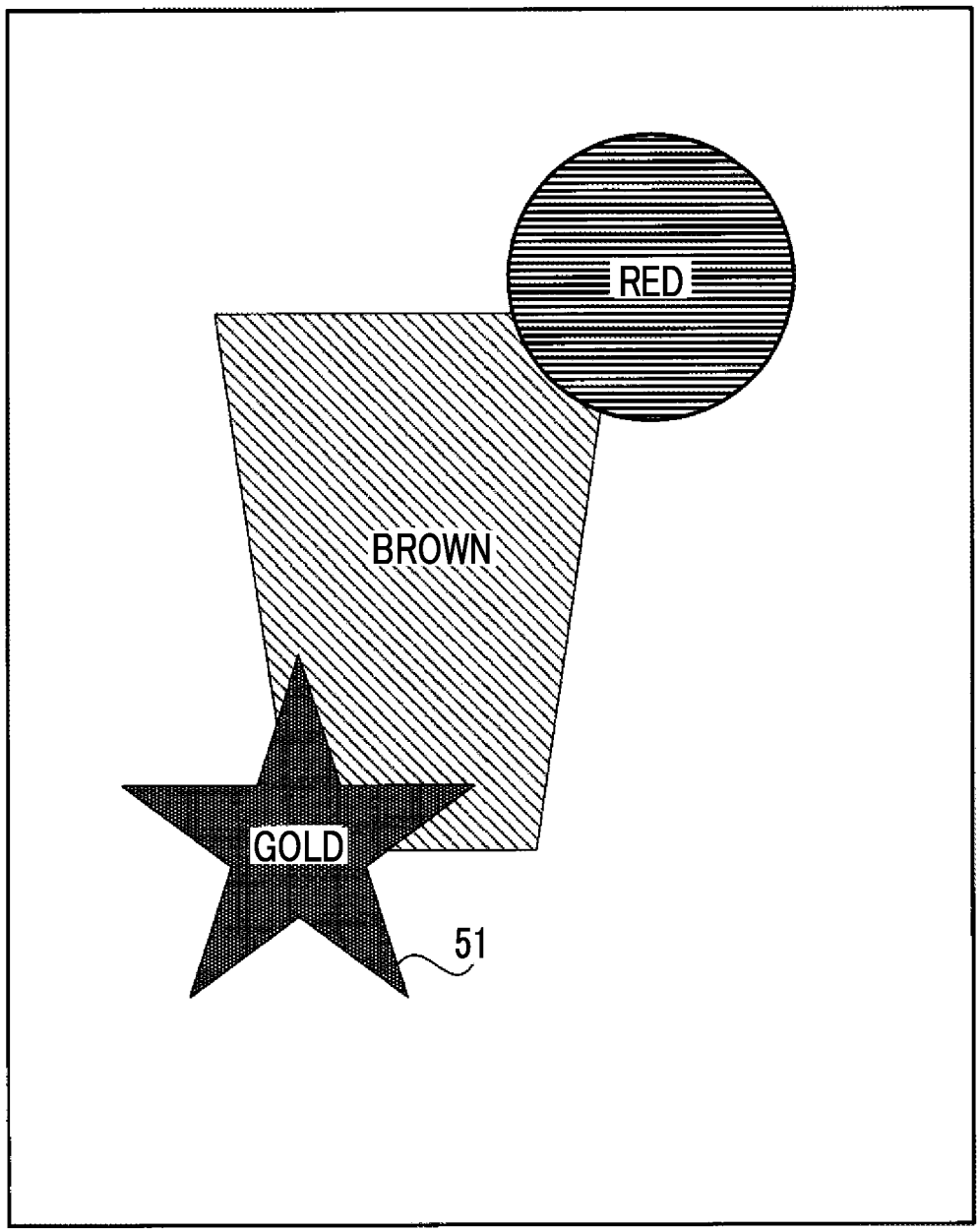
FIG. 4 is a diagram showing an example of an image after paper, on which the image as shown in FIG. 3 is printed, is set in an image forming apparatus 20 and printing is performed by the image forming apparatus 20.

Then, FIG. 4 shows an example of an image obtained after the paper on which the images as shown in FIG. 3 are printed is set in the image forming apparatus 20 and the printing is performed by the image forming apparatus 20.

In the example of the image shown in FIG. 4, it can be seen that an image 51 of a gold color is printed by the image forming apparatus 20 in addition to the image of the red color and the image of the brown color printed by the image forming apparatus 10.

Even in a case where overprint printing is performed by the two image forming apparatuses 10 and 20, there is a case of confirming that a printing process is performed correctly by displaying a preview image, which is a pre-confirmation image for performing pre-confirmation of the print result before executing the printing process, on the terminal apparatus 40.

Next, an operation of the image forming system of the present exemplary embodiment in a case of displaying the preview image on the terminal apparatus 40 will be described with reference to FIGS. 5 and 6.

Figure 5:
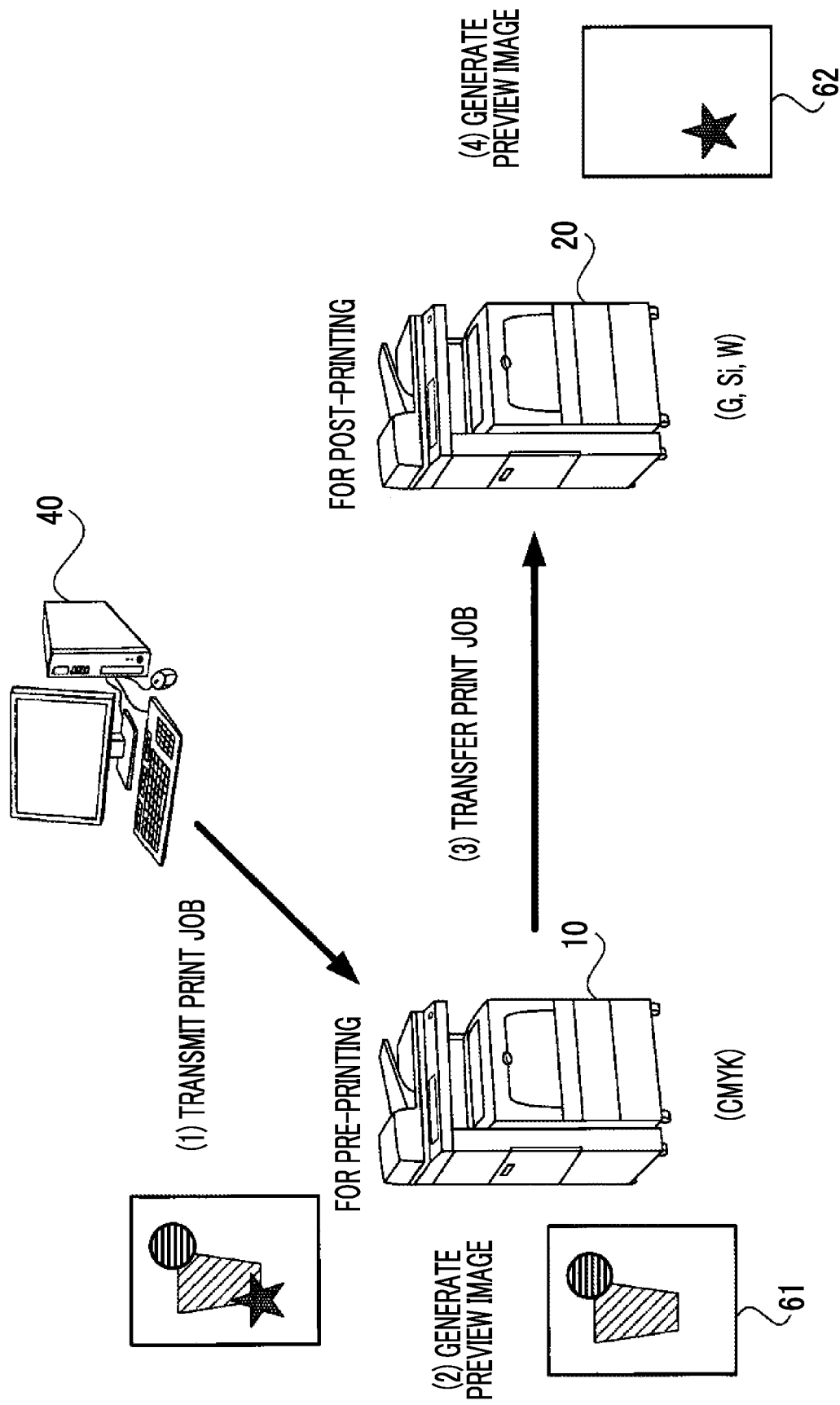
FIG. 5 is a diagram for explaining an operation of the image forming system of one exemplary embodiment of the present invention in a case where a preview image is displayed on a terminal apparatus 40.

(1) First, as shown in FIG. 5, in a case of obtaining the preview image for pre-confirming the print result of the print job for performing overprint printing, the terminal apparatus 40 transmits a print job, together with an instruction to generate the preview image, to the pre-printing image forming apparatus 10.

(2) Then, the image forming apparatus 10 receives the print job from the terminal apparatus 40, generates a preview image 61 based on an image obtained through designation of the CMYK colors, the designation ignoring the designation of the special color in the print job, and transmits the preview image to the terminal apparatus 40.

(3) Then, the image forming apparatus 10 transfers the print job received from the terminal apparatus 40 to the post-printing image forming apparatus 20.

(4) The image forming apparatus 20 that has received the print job from the image forming apparatus 10 generates a preview image 62 based on the designation of the special color in the received print job, and transmits the preview image 62 to the terminal apparatus 40.

Figure 6:
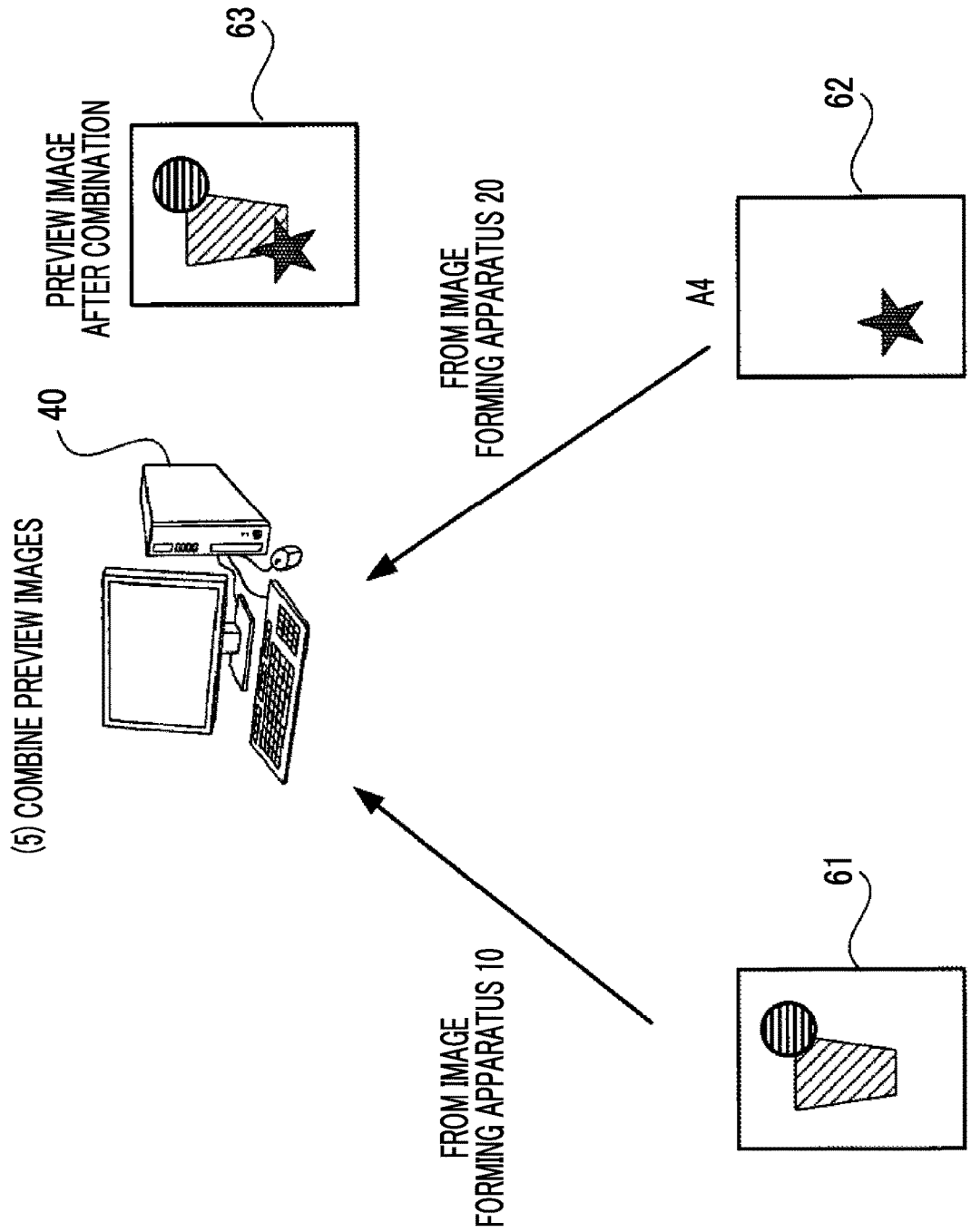
FIG. 6 is a diagram for explaining the operation of the image forming system of one exemplary embodiment of the present invention in the case where the preview image is displayed on a terminal apparatus 40.

(5) Then, as shown in FIG. 6, the terminal apparatus 40, which has received the preview image 61 from the image forming apparatus 10 and the preview image 62 from the image forming apparatus 20, obtains a preview image 63 for the generated print job by combining the two preview images 61 and 62, and displays the preview image 63 on a screen or the like.

Figure 7:
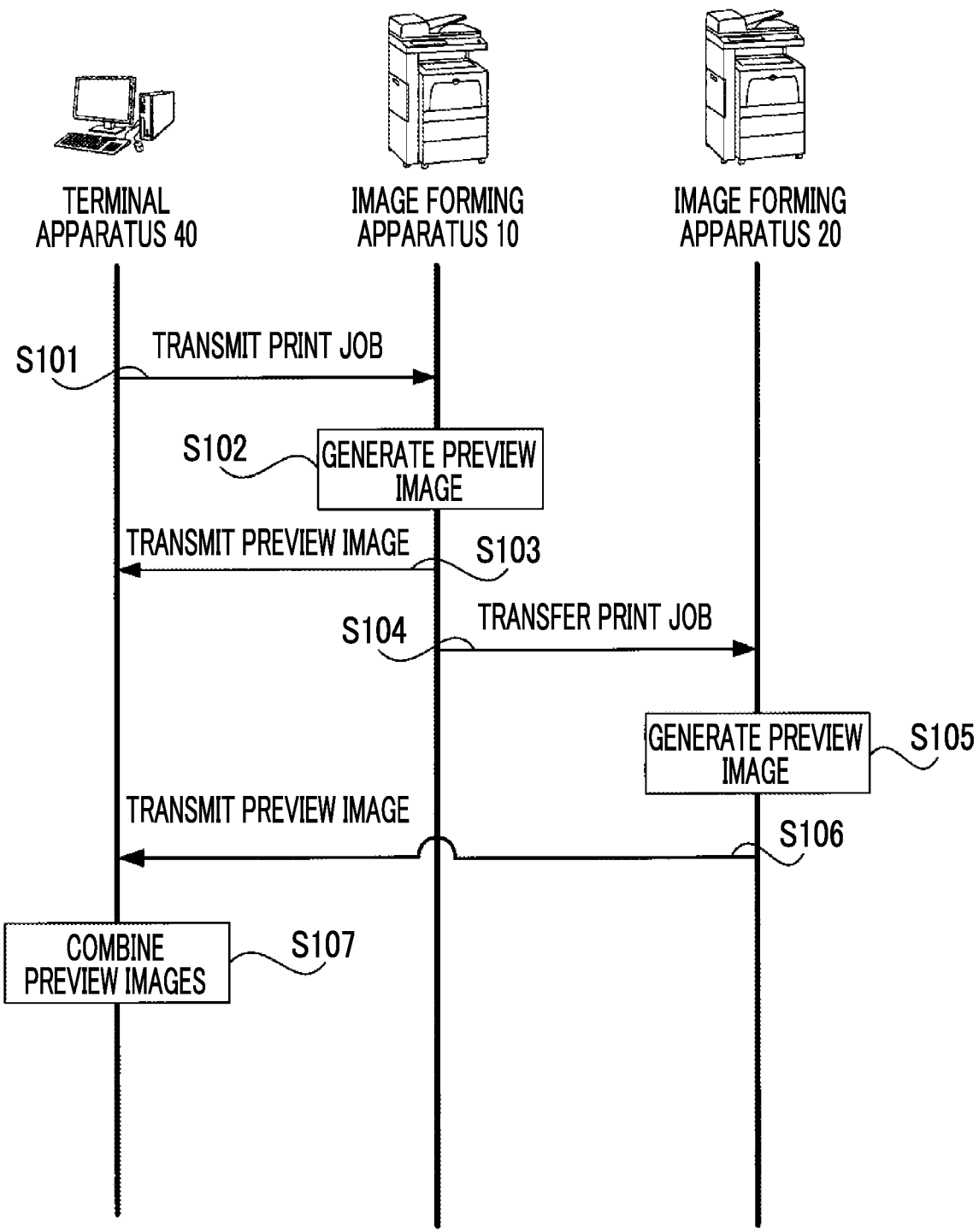
FIG. 7 is a sequence chart for explaining a state of data transmission and reception between the terminal apparatus 40 and the image forming apparatuses 10 and 20 in the case where the preview image is displayed on the terminal apparatus 40.

Next, a state of data transmission and reception between the terminal apparatus 40 and the image forming apparatuses 10 and 20 in a case where the preview image described above is displayed on the terminal apparatus 40 will be described with reference to a sequence chart of FIG. 7.

First, in step S101, the terminal apparatus 40 transmits the print job to the pre-printing image forming apparatus 10, together with the instruction to generate the preview image.

Then, in a case where the image forming apparatus 10 receives the print job from the terminal apparatus 40, in step S102, the image forming apparatus 10 generates the preview image based on the image obtained through the designation of the CMYK colors, the designation ignoring the designation of the special color in the print job. Then, the image forming apparatus 10 transmits the generated preview image to the terminal apparatus 40 in step S103.

Then, in step S104, the image forming apparatus 10 transfers the print job received from the terminal apparatus 40 to the post-printing image forming apparatus 20.

The image forming apparatus 20, which has received the print job from the image forming apparatus 10, generates the preview image 62 based on the designation of the special color in the received print job in step S105. Then, the image forming apparatus 20 transmits the generated preview image to the terminal apparatus 40 in step S106.

Finally, the terminal apparatus 40, which has received the preview image from the image forming apparatus 10 and the preview image from the image forming apparatus 20, in step S107, combines the two received preview images to generate a preview image for the generated print job.

According to the flow as described above, the terminal apparatus 40 can generate the preview image for the print job of the overprint printing to be executed from now one and display the preview image on the screen.

Here, the image forming apparatuses 10 and 20 generate the preview images, to which the processes to be charged and executed by the image forming apparatuses 10 and 20, respectively, are reflected, and transmit the preview images to the terminal apparatus 40. By the way, it is not always possible to execute the printing process according to the setting content of the print job in both the image forming apparatuses 10 and 20. In a case where the process cannot be executed according to the setting content of the print job, there is a case where the image forming apparatuses 10 and 20 execute the print job after changing the setting content of the print job to be executable in the image forming apparatuses 10 and 20. As a result, in a case where, between the image forming apparatuses 10 and 20, the preview image is generated according to the settings of the original print job, or the preview image is generated after changing the setting content, there is a case where a contradiction occurs between the preview images so that combination is not possible. For example, in a case where, while A4 size paper, which is the setting of the print job, cannot be processed, the image forming apparatus 10 generates a letter size preview image, which has a size that can be processed at the closest size, and the image forming apparatus 20 generates an A4 size preview image, the terminal apparatus 40 cannot combine the two preview images.

Next, an operation in a case where the two preview images acquired in the terminal apparatus 40 as described above cannot be combined will be specifically described with reference to FIGS. 8 and 9.

Figure 8:
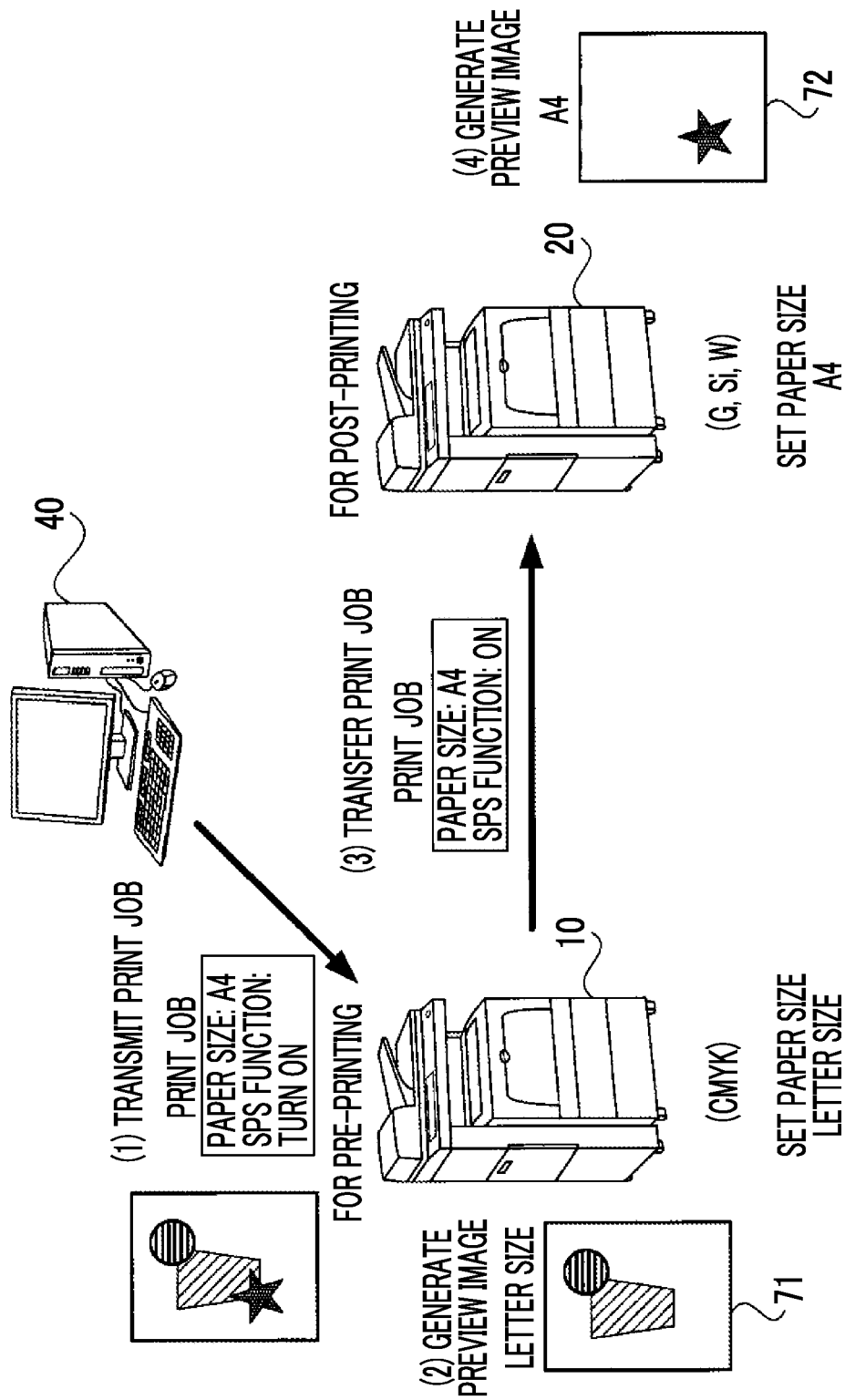
FIG. 8 is a diagram for specifically explaining an operation for a case where two preview images acquired by the terminal apparatus 40 cannot be combined.

First, in FIG. 8, description will be performed while assuming that the paper of the paper size of the letter size is set in the image forming apparatus 10 and the paper of the paper size of A4 is set in the image forming apparatus 20.

(1) First, in a case of obtaining the preview image for pre-confirming the print result of the print job for performing overprint printing, the terminal apparatus 40 transmits an instruction to generate the preview image and the print job to the pre-printing image forming apparatus 10. In FIG. 8, the terminal apparatus 40 will be described as an apparatus which transmits the print job for designating A4 as the paper size and turning on an SPS function to the image forming apparatus 10.

Here, the SPS function is an alternative paper selection function and is a function of selecting and printing paper of a paper size closest to the designated paper size in the paper size of the set paper in a case where the paper of the paper size designated in the print job is not set.

That is, in a case where the SPS function is turned on and even in a case where the paper size designated in the print job is A4, in a case where the A4 size (210×297 mm) paper is not set in the image forming apparatus, paper of a paper size closest to the A4 size, for example, letter size (215.9× 279.4 mm) paper is selected and the printing process is executed.

(2) Then, the image forming apparatus 10 receives the print job from the terminal apparatus 40, and generates a preview image 71 based on the image obtained through the designation of the CMYK colors, the designation ignoring the designation of the special color in the print job, and transmits the preview image 71 to the terminal apparatus 40. In FIG. 8, the A4 size paper is not set in the image forming apparatus 10. By the way, since the SPS function is turned on in the print job from the terminal apparatus 40, the image forming apparatus 10 searches the paper sizes of the paper set in the image forming apparatus 10 for the paper size closest to the A4 size. Here, since the letter size paper is set in the image forming apparatus 10, the letter size is selected as the paper size closest to the A4 size. Therefore, the image forming apparatus 10 generates a preview image 71 in a case where the image is printed on the letter size paper.

(3) Then, the image forming apparatus 10 transfers the print job received from the terminal apparatus 40 to the post-printing image forming apparatus 20. Here, in a case where the image forming apparatus 10 transfers the print job setting content received from the terminal apparatus 40 to the image forming apparatus 20 as it is without changing the setting content, the transferred print job setting content indicates that the paper size is A4 and the SPS function is turned on.

(4) The image forming apparatus 20 that has received the print job from the image forming apparatus 10 generates a preview image 72 based on the designation of the special color in the received print job and transmits the preview image 72 to the terminal apparatus 40. Here, since the A4 size paper is set in the image forming apparatus 10, the preview image 72 obtained in a case where the image is printed on the A4 size paper is generated.

Figure 9:
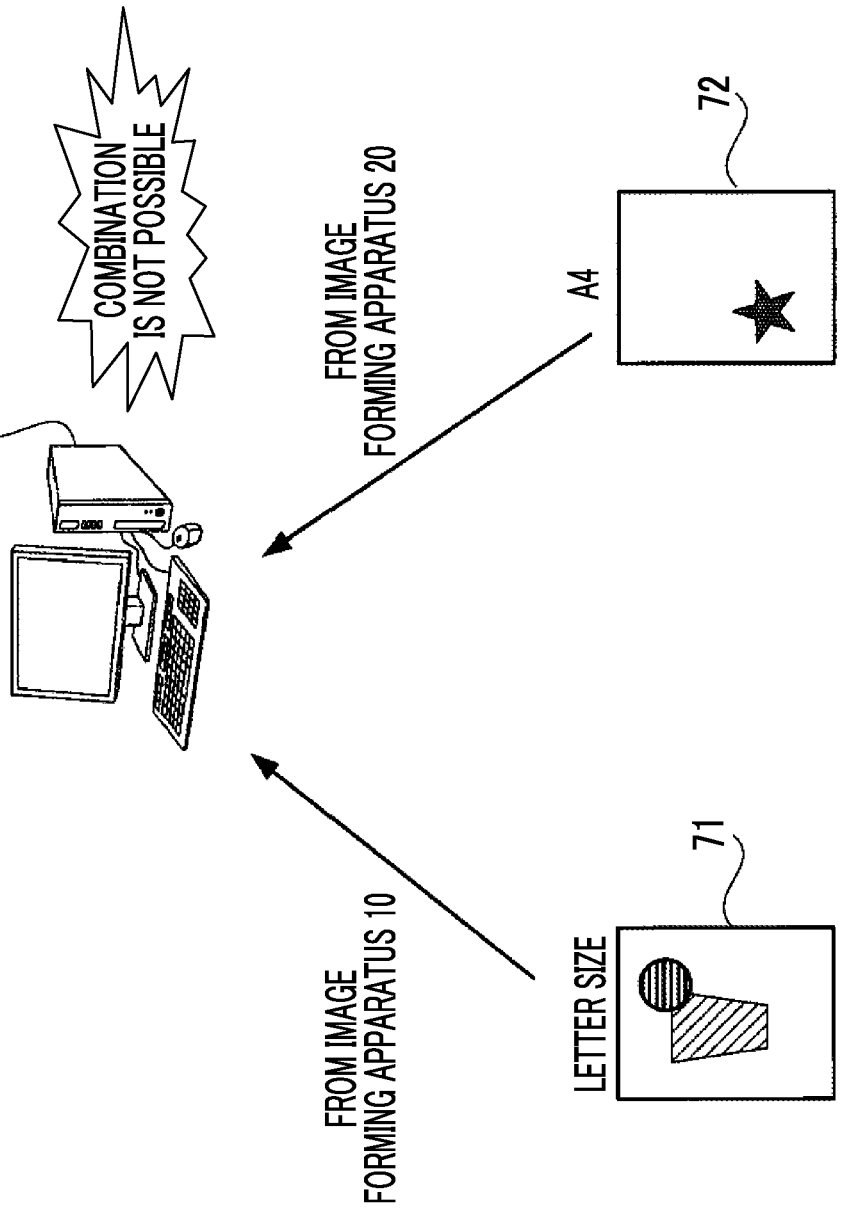
FIG. 9 is a diagram for specifically explaining the operation for the case where two preview images acquired by the terminal apparatus 40 cannot be combined.

(5) Then, as shown in FIG. 9, the terminal apparatus 40, which has received the preview image 71 from the image forming apparatus 10 and the preview image 72 from the image forming apparatus 20, obtains a preview image for the generated print job by combining the two preview images 71 and 72. By the way, the preview image 71 is generated based on the letter size and the preview image 72 is generated based on the A4 size. As a result, the terminal apparatus 40 cannot combine the two preview images 71 and 72 and cannot obtain a preview image for the generated print job.

Therefore, in the image forming system of the present exemplary embodiment, in a case where the printing process is executed by a plurality of image forming apparatuses for one print job, and, even in a case where the printing process may not be executed while not changing the setting content designated in the print job in some image forming apparatuses, the preview image of the print result may be generated by performing the control as described below.

Figure 10:
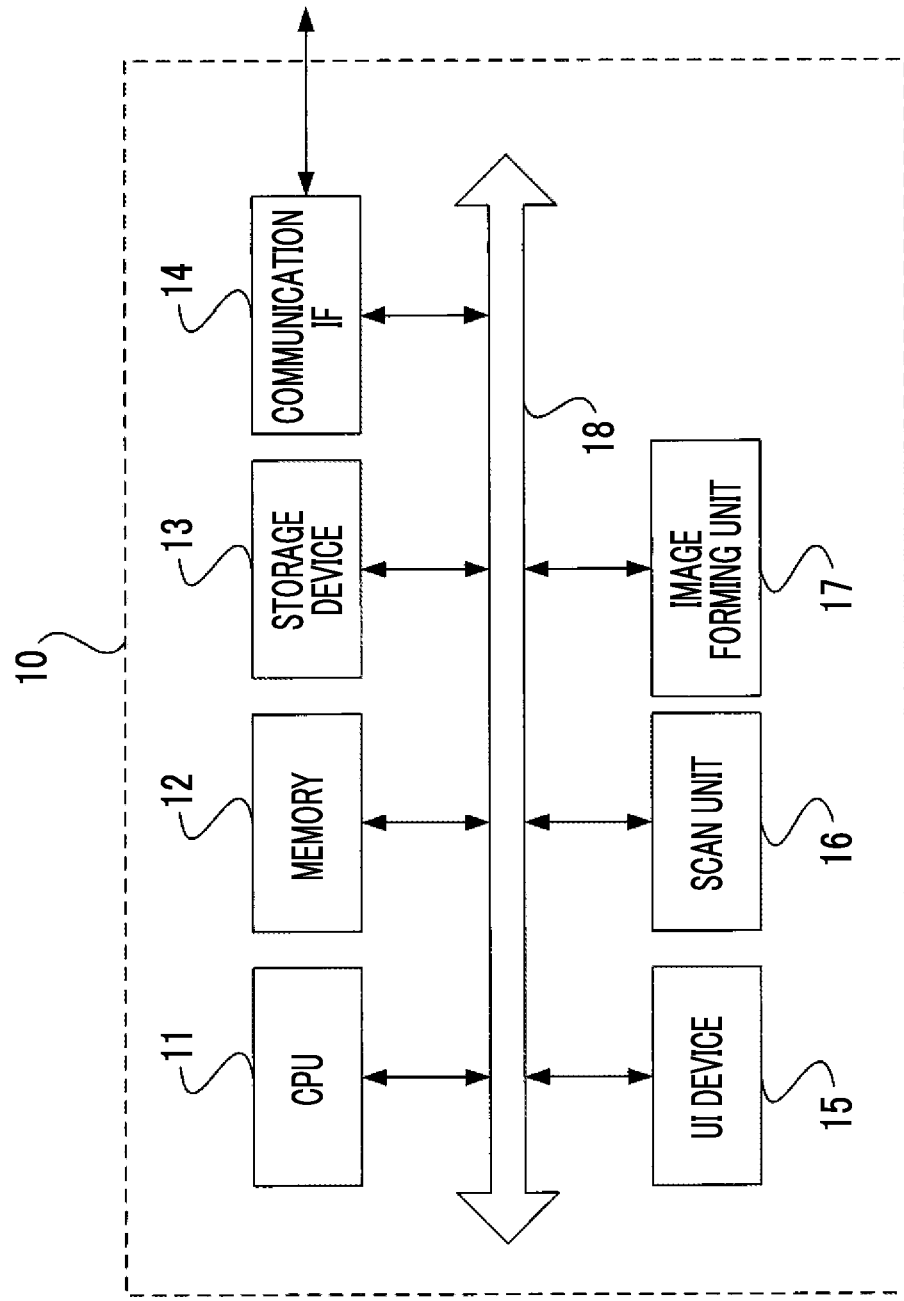
FIG. 10 is a block diagram showing a hardware configuration of the image forming apparatus 10 of one exemplary embodiment of the present invention.

Next, FIG. 10 shows a hardware configuration of the image forming apparatus 10 in the image forming system of the present exemplary embodiment.

As shown in FIG. 10, the image forming apparatus 10 has a CPU 11, a memory 12, a storage device 13 such as a hard disk drive, a communication interface (abbreviated as IF) 14 for transmitting and receiving data to and from an external device and the like via a network 30, a user interface (abbreviated as UI) device 15 including a touch panel, a liquid crystal display, and a keyboard, a scan unit 16, and an image forming unit 17. The components are connected to each other via a control bus 18.

The image forming unit 17 prints an image on a recording medium such as printing paper through steps such as charging, exposure, development, transfer, and fixing.

The CPU 11 is a processor that controls the operation of the image forming apparatus 10 by executing a predetermined process based on a control program stored in the memory 12 or the storage device 13. In the present exemplary embodiment, the CPU 11 has been described as a device which reads and executes the control program stored in the memory 12 or the storage device 13, but the present invention is not limited thereto. The control program may be provided in the form of being recorded on a computer-readable recording medium. For example, the program may be provided in the form of being recorded on an optical disk such as a Compact Disc (CD)-ROM and a Digital Versatile Disc (DVD)-ROM, or in the form of being recorded on a semiconductor memory such as a Universal Serial Bus (USB) memory and a memory card. Further, the control program may be acquired from the external device via a communication line connected to the communication interface 14.

Figure 11:
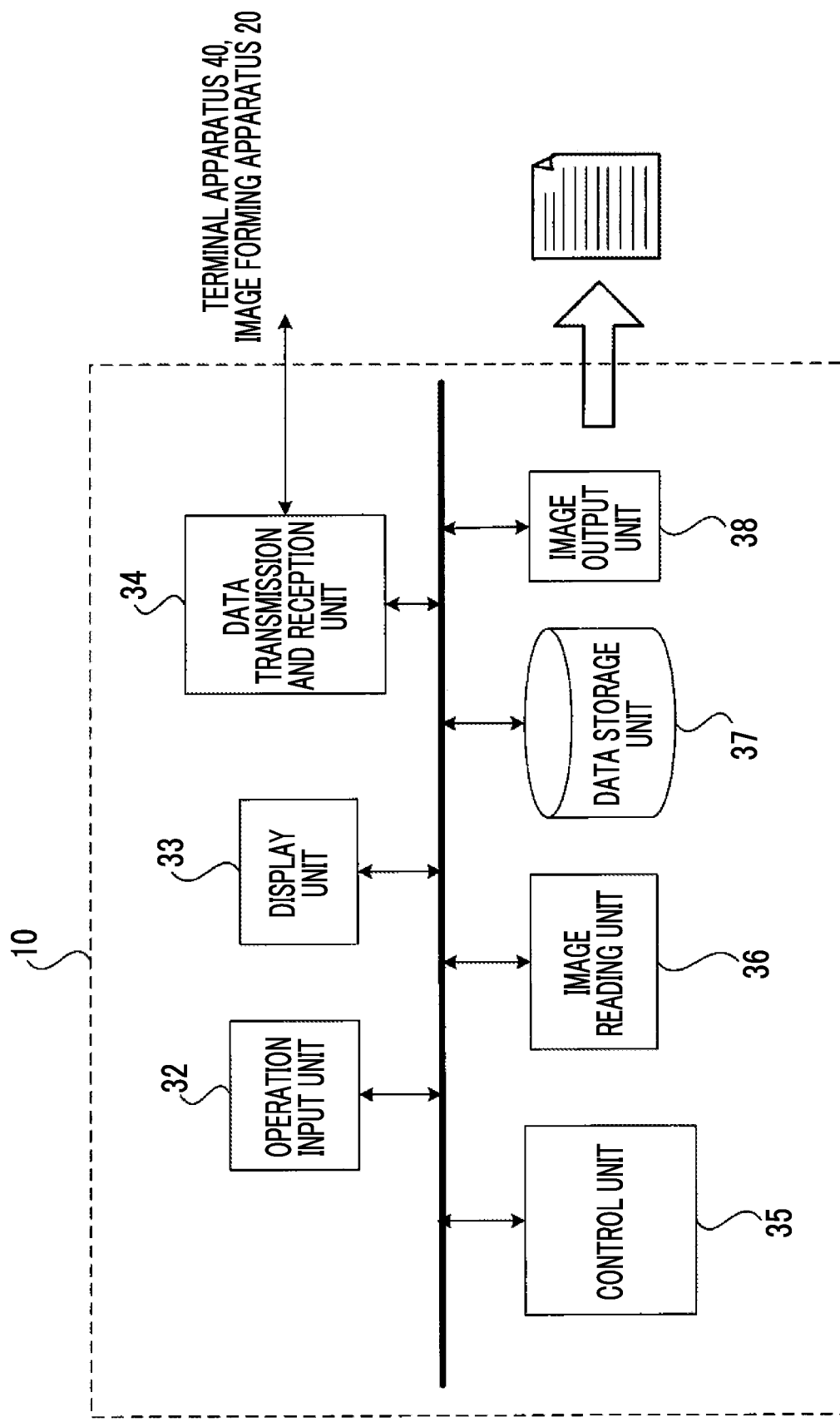
FIG. 11 is a block diagram showing a functional configuration of the image forming apparatus 10 of one exemplary embodiment of the present invention.

FIG. 11 is a block diagram showing a functional configuration of the image forming apparatus 10 realized by executing the control program.

As shown in FIG. 11, the image forming apparatus 10 of the present exemplary embodiment has an operation input unit 32, a display unit 33, a data transmission and reception unit 34, a control unit 35, an image reading unit 36, a data storage unit 37, and an image output unit 38.

The data transmission and reception unit 34 transmits and receives data to and from the external device such as the terminal apparatus 40 and the image forming apparatus 20.

The control unit 35 generates print data based on the print job received from the terminal apparatus 40 via the data transmission and reception unit 34, and controls to output the generated print data from the image output unit 38. The data storage unit 37 stores various data such as the print job received from the terminal apparatus 40 and the print data generated by the control unit 35. Further, the control unit 35 transfers the print job received from the terminal apparatus 40 to the image forming apparatus 20 via the data transmission and reception unit 34.

The display unit 33 is controlled by the control unit 35 and displays various information to the user. The operation input unit 32 inputs various operation information performed by the user.

Since the image forming apparatus 10 in the present exemplary embodiment is an image forming apparatus that prints the normal colors, the image forming apparatus 10 is provided with the image output unit 38 which is a printing processing unit that executes the printing process using the color material such as toners of the normal colors consisting of CMYK. The image output unit 38 outputs an image on the recording medium such as printing paper based on the control of the control unit 35. The image reading unit 36 reads an original image from a set original under the control of the control unit 35.

Then, in a case where the reprint printing is performed, the control unit 35 transmits the print job received from the terminal apparatus 40 to the image forming apparatus 20 that executes a printing process using the color material of the special color other than the normal colors. In the image forming apparatus 10, it is assumed that the image forming apparatus 20 is registered in advance as an image forming apparatus for performing post-printing, and the destination information of the image forming apparatus 20 is stored in the data storage unit 37.

Here, in a case where a print job for forming an image by a plurality of image forming apparatuses is received from the terminal apparatus 40 and the preview image of the print result is requested and in a case where the printing process according to the setting content designated in the print job cannot be executed in the image forming apparatus, the control unit 35 generates the preview image corresponding to an image, which is obtained in a case where the printing process is executed in a state in which the setting content designated in the received print job is changed to setting content that can be executed in the image forming apparatus, and transmits the generated preview image to the terminal apparatus 40 that has transmitted the print job.

After that, the control unit 35 changes the setting content of the received print job to the setting content that can be executed in the image forming apparatus, and transmits the changed setting content to the image forming apparatus 20 which is another image forming apparatus that executes a next printing process.

Specifically, in a case where the paper of the paper size designated in the print job received from the terminal apparatus 40 is not set in the image forming apparatus, the control unit 35 generates a preview image of the print result in a case where the paper of the paper size closest to the designated paper size among the paper set in the image forming apparatus and transmits the preview image to the terminal apparatus 40 that has transmitted the print job. Then, the control unit 35 changes the designation of the paper size in the received print job to the paper size in a case where the preview image is generated, and transmits the designation to the image forming apparatus 20 that executes the next printing process.

At that time, in a case where the paper of the paper size designated in the print job is not set in the image forming apparatus, the control unit 35 may turn off the alternative paper selection function, that is, the SPS function which is a function of selecting the paper of the paper size closest to the paper size designated in the set paper and executing the printing process, and may transmit the print job received from the terminal apparatus 40 to the image forming apparatus 20 that executes the next printing process.

The designation of the paper size of the print job includes not only the designation of the shape of the paper such as A4 and B5, but also the designation of a paper direction such as A4 landscape, postcard portrait, and postcard landscape.

Further, in a case where the control unit 35 receives a print job for overprint printing that forms an image by a plurality of image forming apparatuses from the terminal apparatus 40 and in a case where the printing process according to the setting content designated in the print job can be executed by the image forming apparatus, a preview image of the print result corresponding to the image on which the printing process is executed based on the received print job is generated and transmitted to the terminal apparatus 40 that has transmitted the print job.

In this case, in a case where the printing process according to the setting content designated in the print job cannot be executed in the image forming apparatus, the control unit 35 transmits the print job received from the terminal apparatus 40 to the image forming apparatus 20 that executes the next printing process while not changing the setting state of the alternative setting selection function of changing the setting content designated in the print job so that the printing process can be executed in the image forming apparatus.

The state of data transmission and reception between the terminal apparatus 40 and the image forming apparatuses 10 and 20 in a case where the control as described above is performed will be described with reference to a sequence chart of FIG. 12. In the sequence chart of FIG. 12, only the process of step S201 is added to the sequence chart shown in FIG. 7, and the processing content in the other steps is the same, so the description thereof will be omitted.

Figure 12:
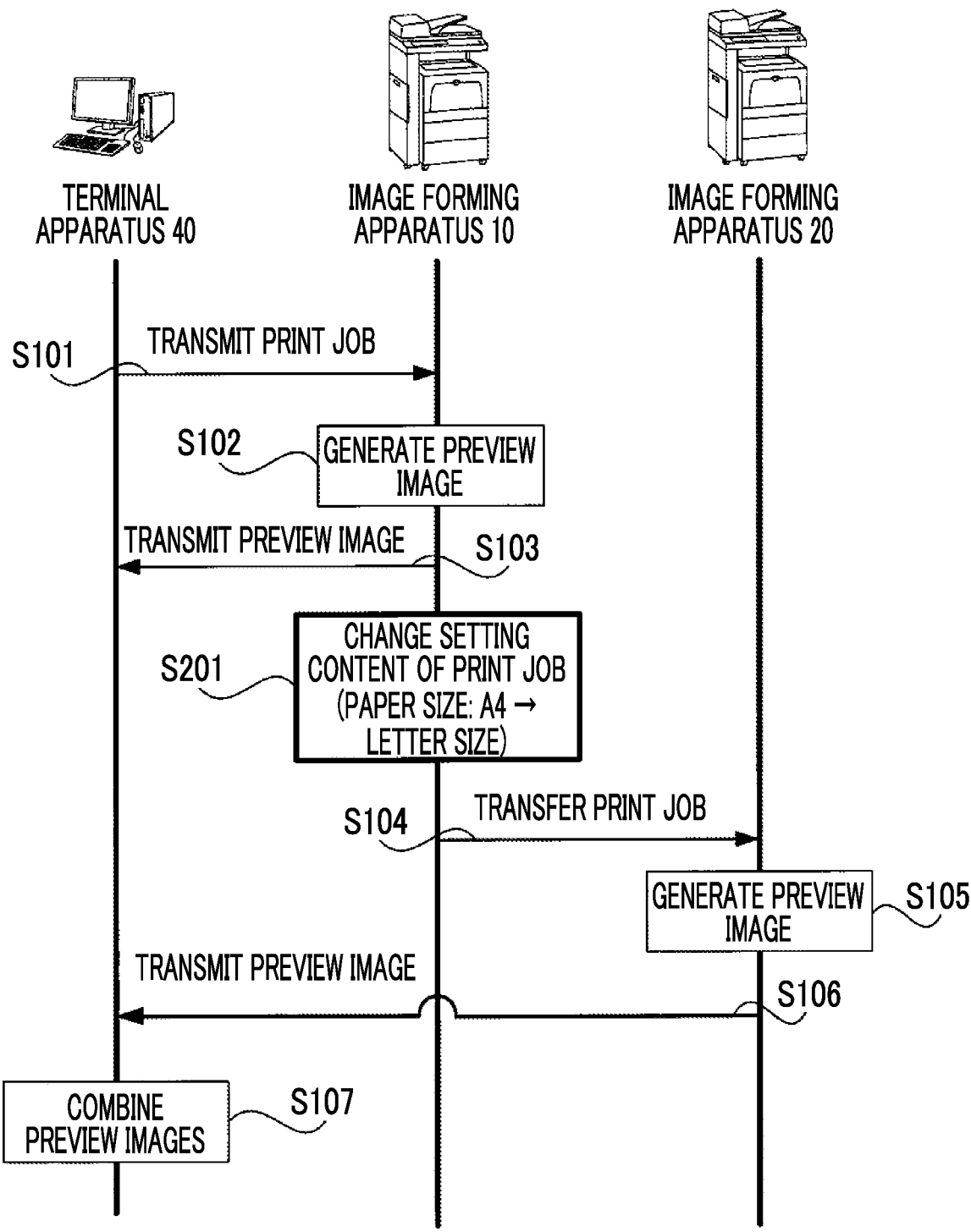
FIG. 12 is a sequence chart for explaining a state of data transmission and reception between the terminal apparatus 40 and the image forming apparatuses 10 and 20 in a case where the image forming apparatus 10 is controlled to change the setting content of the print job.

In the sequence chart of FIG. 12, the image forming apparatus 10 transmits the generated preview image to the terminal apparatus 40 in step S103, and then changes the setting content of the print job in step S201. Specifically, the image forming apparatus 10 changes the designation of the paper size in the print job from A4 to the letter size, and further changes the SPS function from the on state to the off state.

Then, in step S104, the image forming apparatus 10 transfers the print job obtained after changing the setting content in step S201 to the post-printing image forming apparatus 20.

Next, as described above, an operation in the image forming system of the present exemplary embodiment will be described in detail with reference to FIGS. 13 and 14 in a case where the paper sizes of the paper set in the image forming apparatus 10 and the image forming apparatus 20 are different and the setting content of the print job is changed in the image forming apparatus 10.

First, in FIG. 13, description will be performed while assuming that the paper of the paper size of the letter size is set in the image forming apparatus 10 and the paper of the paper size of A4 is set in the image forming apparatus 20.

(1) First, in a case of obtaining the preview image for pre-confirming the print result of the print job for performing overprint printing, the terminal apparatus 40 transmits an instruction to generate the preview image and the print job to the pre-printing image forming apparatus 10. In FIG. 13, the terminal apparatus 40 will be described as an apparatus which transmits the print job, in which A4 is designated as the paper size and the SPS function is set to be turned on, to the image forming apparatus 10.

(2) Then, the image forming apparatus 10 receives the print job from the terminal apparatus 40, and generates a preview image 81 based on the image obtained through the designation of the CMYK colors, the designation ignoring the designation of the special color in the print job, and transmits the preview image 81 to the terminal apparatus 40. Here, since the SPS function is turned on in the print job from the terminal apparatus 40, the image forming apparatus 10 selects the letter size as the paper size closest to the A4 size in the paper sizes of the paper set in the image forming apparatus, and generates the preview image 81 in a case where the image is printed on the paper of the letter size. The operations up to here are the same as in the case of FIG. 8.

(3) Then, the image forming apparatus 10 changes the setting content of the received print job to the setting content that can be executed in the image forming apparatus 10, and transmits the changed setting content to the image forming apparatus 20 that executes the next printing process. Specifically, the image forming apparatus 10 changes the designation of the paper size designated in the print job received from the terminal apparatus 40 to the letter size which is the paper size in a case where the preview image 81 is generated, and transmits the changed designation of the paper size to the image forming apparatus 20. At that time, the image forming apparatus 10 changes the SPS function in the print job from the on state to the off state, and then transfers the changed content to the image forming apparatus 20.

The reason why the print job is transferred to the image forming apparatus 20 after the SPS function is changed to the off state in the image forming apparatus 10 is as follows. That is, the reason is that, in a case where the print job with the SPS function which is turned on is transferred to the image forming apparatus 20 and in a case where the image forming apparatus 20 does not set the paper of the letter size but sets the paper of the A4 size, the preview image is generated after changing the designated paper size from the letter size to the A4 size. In a case where the image forming apparatus 20 generates the preview image of the A4 size, the image forming apparatus 10 generates the preview image of the letter size, so that the terminal apparatus 40 cannot combine the two preview images.

(4) Next, the image forming apparatus 20 that has received the print job from the image forming apparatus 10 generates a preview image 82 based on the designation of the special color in the received print job and transmits the preview image 82 to the terminal apparatus 40. Here, although the paper of the A4 size is set in the image forming apparatus 10, the SPS function is turned off, so that the image forming apparatus 10 generates the preview image 82 in a case where the image is printed on the paper of the letter size.

(5) Then, as shown in FIG. 14, in the terminal apparatus 40 which has received the preview image 81 from the image forming apparatus 10 and the preview image 82 from the image forming apparatus 20, a preview image 83 for the generated print job is generated by combining the two preview images 81 and 82. Here, since both the two preview images 81 and 82 are generated based on the letter size, the terminal apparatus 40 combines the two preview images 81 and 82 without any problem, and can obtain the combined preview image 83.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification Example

In the above exemplary embodiment, the case where the present invention is applied to the setting content of the paper size in the print job has been described, but the present invention is not limited thereto. In a case where two preview images cannot be combined because of the difference in the setting content, the present invention can be similarly applied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a processor configured to:
in a case where a print instruction to form an image by a plurality of image forming apparatuses is received from a terminal apparatus and a pre-confirmation image of a print result is requested and in a case where an image forming apparatus is not possible to execute a printing process according to setting content designated in the print instruction, generate a pre-confirmation image corresponding to an image, which is obtained in a case where the printing process is executed in a state in which the setting content designated in the print instruction is changed to setting content that is executable in the image forming apparatus to transmit the generated pre-confirmation image to the terminal apparatus that has transmitted the print instruction; and
change the setting content of the print instruction to the setting content that is executable in the image forming apparatus to transmit the changed setting content to another image forming apparatus that executes a next printing process.

2. The image forming apparatus according to claim 1, wherein the processor configured to:
in a case where paper of a paper size designated in the print instruction received from the terminal apparatus is not set in the image forming apparatus, generate a pre-confirmation image of a print result in a case where paper of a paper size closest to the designated paper size among paper set in the image forming apparatus to transmit the pre-confirmation image to the terminal apparatus that has transmitted the print instruction, and change designation of the paper size in the print instruction to the paper size in a case where the pre-confirmation image is generated to transmit the changed designation to the other image forming apparatus that executes the next printing process.

3. The image forming apparatus according to claim 2, wherein the processor configured to:
in a case where the paper of the paper size designated in the print instruction is not set in the image forming apparatus, cause an alternative paper selection function, which is a function of selecting the paper of the paper size closest to the designated paper size among the set paper and executing the printing process, to be an off state to transmit the print instruction received from the terminal apparatus to the other image forming apparatus that executes the next printing process.

4. The image forming apparatus according to claim 1, wherein designation of a paper size of the print instruction includes not only designation of a shape of paper but also designation of a paper direction.

5. The image forming apparatus according to claim 2, wherein designation of the paper size of the print instruction includes not only designation of a shape of the paper but also designation of a paper direction.

6. The image forming apparatus according to claim 3, wherein designation of the paper size of the print instruction includes not only designation of a shape of the paper but also designation of a paper direction.

7. The image forming apparatus according to claim 1, wherein the processor configured to:

in a case where the print instruction to form the image by the plurality of image forming apparatuses is received from the terminal apparatus and in a case where the image forming apparatus is possible to execute the printing process according to the setting content designated in the print instruction, generate a pre-confirmation image of a print result corresponding to an image on which the printing process is executed based on the print instruction to transmit the pre-confirmation image to the terminal apparatus that has transmitted the print instruction.

8. The image forming apparatus according to claim 7, wherein the processor configured to:
in a case where the image forming apparatus is not possible to execute the printing process according to the setting content designated in the print instruction, transmit the print instruction received from the terminal apparatus to the other image forming apparatus that executes the next printing process without changing a setting state of an alternative setting selection function of changing the setting content designated in the print instruction so that the printing process is executable in the image forming apparatus.

9. The image forming apparatus according to claim 1, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

10. The image forming apparatus according to claim 2, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

11. The image forming apparatus according to claim 3, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

12. The image forming apparatus according to claim 4, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

13. The image forming apparatus according to claim 5, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

14. The image forming apparatus according to claim 6, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

15. The image forming apparatus according to claim 7, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

16. The image forming apparatus according to claim 8, further comprising:
a printing processing unit that executes a printing process using a normal color material consisting of cyan, magenta, yellow, and black,
wherein the processor is configured to transmit the print instruction received from the terminal apparatus to an image forming apparatus that executes a printing process using a color material of a special color other than the normal colors.

17. A non-transitory computer readable medium storing a program causing a computer to execute a process comprising:
generating, in a case where a print instruction to form an image by a plurality of image forming apparatuses is received from a terminal apparatus and a pre-confirmation image of a print result is requested and in a case where an image forming apparatus is not possible to execute a printing process according to setting content designated in the print instruction, a pre-confirmation image corresponding to an image, which is obtained in a case where the printing process is executed in a state in which the setting content designated in the print instruction is changed to setting content that is executable in the image forming apparatus to transmit the generated pre-confirmation image to the terminal apparatus that has transmitted the print instruction; and
changing the setting content of the print instruction to the setting content that is executable in the image forming apparatus to transmit the changed setting content to another image forming apparatus that executes a next printing process.

18. An image forming method comprising:
generating, in a case where a print instruction to form an image by a plurality of image forming apparatuses is received from a terminal apparatus and a pre-confirmation image of a print result is requested and in a case where an image forming apparatus is not possible to execute a printing process according to setting content designated in the print instruction, a pre-confirmation image corresponding to an image, which is obtained in a case where the printing process is executed in a state in which the setting content designated in the print instruction is changed to setting content that is executable in the image forming apparatus to transmit the generated pre-confirmation image to the terminal apparatus that has transmitted the print instruction; and changing the setting content of the print instruction to the setting content that is executable in the image forming apparatus to transmit the changed setting content to another image forming apparatus that executes a next printing process.

\* \* \* \* \*